3,055,817
PROCESS FOR PRODUCING NITROGEN
TRIFLUORIDE
Joseph Gordon, Morris Township, Morris County, and
Bernard Sukornick, Elizabeth, N.J., assignors to Allied
Chemical Corporation, New York, N.Y., a corporation
of New York
No Drawing. Filed May 16, 1961, Ser. No. 111,423
6 Claims. (Cl. 204—157)

This invention relates to processes for manufacture of nitrogen trifluoride, $NF_3$, normally a colorless gas, and having a boiling point of about minus 129° C. and a melting point of about minus 208° C.

It has been proposed to make nitrogen trifluoride by electrolysis of molten ammonium acid fluoride, $NH_4HF_2$, using a graphite anode and temperature of about 125° C.; by reaction of fluorine azide with elemental fluorine; and by reaction of ammonia with elemental fluorine.

An object of this invention is to provide feasible methods for making nitrogen trifluoride without recourse to electrochemical procedures; without the large loss of fluorine and $NH_4F$ necessarily involved in the reaction of ammonia and elemental fluorine; and without the recognized disadvantages usually inherent in processes requiring use of elemental fluorine and hydrogen containing compounds.

It has been found that oxygen difluoride, a relatively mild fluorinating agent, when reacted under certain actinic radiation conditions with fluorine azide brings about formation of nitrogen trifluoride. The invention comprises the discovery of the adaptability of fluorine azide as a starting material, the effectiveness of the fluorinating properties of oxygen difluoride with respect to conversion of fluorine azide to nitrogen trifluoride, and the reaction conditions, all of which factors interdependently cooperate to constitute practicable and easily controllable methods for making nitrogen trifluoride without the use of elemental fluorine.

Fluorine azide, $FN_3$, is a known greenish yellow normally gaseous material having a boiling point of about minus 78° to minus 82° C. and a melting point of about minus 154° C., and may be made according to any suitable known method. The following, although utilizing elemental fluorine, affords a particularly advantageous technique because only a quantiative amount of fluorine is used, and the reaction is smooth and without explosive tendencies. Apparatus employed included a three-necked flask fitted with a helium inlet tube, a burette, and an outlet tube leading to a Drierite scrubber. A sulfuric acid solution of about 76% $H_2SO_4$ strength was flowed from the burette drop-wise onto powdered sodium azide, $NaN_3$, in the flask at rate of about 0.05 cc./min. The $NaN_3$ material in the generator was held at temperature of about 48° C., by means of an electrically heated tape, to prevent liquefaction of the $HN_3$ formed. Hydrazoic acid gas, $HN_3$ was evolved at a rate of about 0.08 mol/hr. The $HN_3$ thus produced was diluted with helium and the gaseous mixture passed thru the Drierite to remove all traces of water and form an anhydrous mixture. Quantity of helium employed for dilution was such that the gas mixture contained $HN_3$ and helium in volume ratio of about one to three. The anhydrous $HN_3$-helium gas mixture was run into the head end of a copper reactor coil, about 12 ft. long and about ¼" I.D., at rate to supply about 0.08 mol/hr. of $HN_3$. At the same time, elemental fluorine diluted with nitrogen was introduced into the head end of the reactor coil. Nitrogen dilution was such as to form a mixture having a fluorine to nitrogen volume ratio of about one to 0.75. Rate of introduction of the fluorine-nitrogen mixture to the reactor was such as to charge elemental fluorine at a rate of about 0.045 mol/hr., i.e. slightly more than 0.5 mol of fluorine was fed per mol of $HN_3$. During the ensuing reaction, the reactor was maintained at temperature of about 25° C. The gaseous exit of the reactor contained fluorine azide, nitrogen and helium. Dilution of the fluorine azide gas with helium and nitrogen inerts was such as to provide a fluorine azide-gaseous inerts volume ratio of about one to three. Infrared spectrum analysis of the gaseous exit of the reactor showed a complete absence of nitrogen trifluoride, thus showing no detectable conversion of $FN_3$ to $NF_3$ by the slight excess of fluorine present.

To avoid tendencies toward instability, the fluorine azide starting material employed in all modifications of the invention is preferably always maintained, handled and used in gas phase, i.e. the azide is held at a minimum temperature, conveniently say 10–15° C. above the minus 78–minus 82° C. boiling point, such that the material is always in gas phase. Operations herein are preferably carried out at substantially atmospheric pressure, although other pressures may be employed while having regard for maintenance of the azide in the gas phase. Further, to avoid possible explosion, a volume of $FN_3$ is preferably kept diluted with at least two volumes of an inert gas such as nitrogen or helium.

Oxygen difluoride, $OF_2$, is a known normally colorless gas material having a boiling point of about minus 145° C. $OF_2$ may be made as known, for example by passing elemental fluorine into a 2% aqueous sodium hydroxide solution which holds oxygenated impurities in nonvolatile form. The oxygen difluoride may be made also by reaction of elemental fluorine and perchloric acid flowing over graphite.

Although not fully understood, reactions involved in practice of the invention are thought to be along the lines of $$2FN_3 + 2OF_2 \rightarrow 2NF_3 + 2N_2 + O_2$$

General practice of the invention comprises introducing gaseous fluorine azide and gaseous oxygen difluoride into a reaction zone, subjecting the material in said zone to actinic radiation sufficient to effect reaction of fluorine azide and oxygen difluoride to form nitrogen trifluoride, and discharging from the reaction zone gaseous reaction products containing nitrogen trifluoride.

Apparatus may comprise an elongated tubular reactor provided at one end with valved inlets for metered charging of incoming gaseous $FN_3$ and incoming gaseous $OF_2$, and at the other end with a gas outlet connected to the inlet of a cold trap equipped with refrigerating equipment to maintain the trap at the herein described low temperatures. The trap is usually provided with a gas vent to permit passage thru the trap of inert diluting gas, and may be equipped with other valved outlets thru which, during a reaction run, liquid condensate may be drawn off to a fractionator, or, following a reaction run, condensate may be fractionated off to recover nitrogen trifluoride to separate the same from other materials. Apparatus other than the reactor may be made of any suitable material, such as nickel and Monel, which is corrosive-resistant to the reactants and products and byproducts involved. The tubular reactor proper may be of any composition which permits exposure of the reactants therein to the action of actinic radiation. Suitable materials of reactor construction are quartz, Vycor, polychlorotrifluoroethylene, quartz being preferred.

Actinic radiation techniques in general, such as selection of composition of the reactor and selection of suitable sources of light, are well known. Any form of light which effects chemical reaction may be employed such as high or low pressure mercury vapor lamps, and ordinary incandescent lamps. Ultraviolet radiation is preferred.

In accordance with the invention, it has been found that fluorine azide and oxygen difluoride may be reacted when subjected to the action of actinic radiation at about room temperature. Fluorine azide and oxygen difluoride are usually available at temperatures around 20° C. There appears to be no critical lower temperature limit as long as incoming reactants are in the gas phase. However, reaction temperatures below about zero degrees C. afford no advantage and are not preferred. We find that stability of the fluorine azide in gas form is adequately maintained at temperatures below about 100° C., but to enhance fluorine azide stability it is preferred to hold maximum temperature not substantially higher than about 40° C. Accordingly, reaction temperatures may be those at which incoming reactants are in gas phase but not substantially more than about 100° C. More particularly, temperatures are within the range of zero to 100° C., preferably in the range of zero to 40° C., and in usual practice reaction temperatures are ordinarily within a few degrees plus or minus of 20° C. Reactions are not appreciably exothermic or endothermic. In large scale apparatus, reaction temperature may tend to rise because of transmitted heat from the light source and approach the preferred 40° C. upper limit, in which instance the reactor may be air-cooled as needed in any convenient way. In the stated temperature ranges, at substantially atmospheric pressure, the fluorine azide is adequately maintained in the gas phase, and the unstable gas to liquid or liquid to gas transition stages are avoided.

With regard to molar proportions of fluorine azide starting material and fluorinating agent, while possible to operate using at least one molecular proportion of $OF_2$ per mol of $FN_3$, it has been found that in carrying out the reactions described it is highly desirable to employ a molecular excess of $OF_2$ fluorinating agent, and we find that for preferred operation the fluorinating agent should be maintained present in the reaction zone in proportion not substantially less than 1.6 mol per mol of the fluorine azide charged. The indicated molecular excess of fluorinating agent provides for the better reaction results, for prevention of dimerization of $FN_3$ to $F_2N_2$, and more importantly prevents the presence of unreacted $FN_3$ in the reactor exit which $FN_3$, if present and entering the cold trap operating at temperature below the boiling point of $FN_3$, would pass thru the unstable gas to liquid stage.

It has been found that to effect formation of nitrogen trifluoride, the $FN_3$ and $OF_2$ should be subjected to actinic radiation in the range of 2000–5000 Angstrom units, preferably in the range of 2500–4000. Hence, in order to effectuate the stated degree of radiation, the controlling variables, such as composition of the reactor shell, type of light used, intensity of light, and residence time of reactant materials in the reactor, may be chosen and adjusted accordingly within the skill of known actinic radiation techniques.

Residence time of reactants in the reactor is highly variable, and is dependent mostly upon the other major variables, namely composition of the reactor shell, type and intensity of light. It will be understood that for say an ordinary glass reactor and a relatively low wattage incandescent light, residence time of necessity is substantially higher than in the case of say a quartz reactor and an ultraviolet lamp of several hundred watts intensity. However, optimum residence time is the most easily regulated variable and hence, depending upon particular apparatus available, may be determined by a test run or two. In general, working with reasonably satisfactory equipment, residence time may lie in the range of 1 to 10 seconds. In a particular instance, using say a quartz reactor and an ultraviolet lamp of about 350 watts, residence time may lie in the range of 2 to 7 seconds.

The reactor exit contains $NF_3$; unreacted $OF_2$; nitrogen; and possibly a small amount of $F_2N_2$, B.P. minus 106–111° C. Recovery of nitrogen trifluoride and separation of the same from other materials contained in the gaseous exit of the reaction zone may be effected more or less conventionally as known in this art, i.e. by condensation followed by suitable fractionation. For example, all gaseous exit of the reactor, except nitrogen and any helium diluent, may be totally condensed in a cold trap externally refrigerated by means of liquid nitrogen. In subsequent fractionation of cold trap condensate, unreacted $OF_2$ (B.P. minus 145° C.) is removed. Thereafter nitrogen trifluoride may be recovered as fractionator overhead in relatively pure form in view of the substantial differences in boiling points between $OF_2$ boiling well below the minus 129° C. of $NF_3$ which value is in turn well below the minus 109° C. and minus 96° C. boiling points of $F_2N_2$ and $SiF_4$, which $SiF_4$ may be present in relatively small amounts in the case of use of siliceous reactors. Alternatively, reactor exit may be refrigerated to any low temperature just suitably below the minus 129° C. boiling point of nitrogen trifluoride, e.g. to temperature of about minus 135° C. For this purpose the cold trap may be maintained in a slush of isopentane and liquid nitrogen. In this situation, unreacted $OF_2$ is vented from the cold trap along with nitrogen and helium, and at the end of a run the cold trap may be permitted to warm up and nitrogen trifluoride recovered as overhead. Further, in a continuous operation, condensate may be continuously withdrawn from the bottom of the cold trap and fractionated in separate equipment.

Nitrogen trifluoride is a material of known utility, for example as an intermediate for reaction with a metal to make tetrafluorohydrazine, $N_2F_4$, a commercially available material.

The following illustrates practice of the invention. Apparatus employed comprised principally a tubular quartz reactor about 12" long, about 1/16" I.D., and provided at one end with an inlet for regulated introduction of gaseous $FN_3$ and an inlet for regulated introduction of gaseous $OF_2$, and at the other end with a gas outlet. Over a period of about 20 minutes, fluorine azide gas, substantially at room temperature and made as described above and having the indicated inert dilution, was fed into the reactor at a rate of about 0.078 mol/hr. Simultaneously with introduction of the fluorine azide gas, oxygen difluoride gas, substantially at room temperature and diluted with about one volume of nitrogen, was charged into the reactor at a rate ($OF_2$ basis) of about 0.138 mol/hr. Throughout the run, material in the reactor was subjected to the action of actinic radiation in the range of about 2500 to 4000 Angstrom units, such radiation having been afforded by a 360-watt ultraviolet lamp placed about 6" from the longitudinal axis of the reactor. During the run, there was maintained in the reactor approximately a 76% mol excess of $OF_2$ fluorinating agent. Reaction was not detectably exothermic, and temperature in the reactor held at about 20° C. or a few degrees above. Feed of incoming reactants was such that residence time in the reactor was about 2–7 seconds. Infrared spectrum analysis of the gas exiting the reactor showed that the gaseous reaction products discharged from the reactor contained nitrogen trifluoride plus smaller amounts of unreacted $OF_2$, $SiF_4$ and $F_2N_2$. No unreacted $FN_3$ was detected.

We claim:
1. The process for making nitrogen trifluoride which comprises introducing gaseous fluorine azide and gaseous oxygen difluoride into a reaction zone, subjecting the material in said zone, at temperature below about 100° C., to actinic radiation sufficient to effect reaction of fluorine azide and oxygen difluoride to form nitrogen trifluoride, and discharging from said zone gaseous reaction products containing nitrogen trifluoride.

2. The process of claim 1 in which the degree of actinic radiation lies in the range of 2000–5000 Angstrom units.

3. The process of claim 1 in which temperature is not substantially higher than 40° C.

4. The process of claim 1 in which fluorine azide and oxygen difluoride are fed in proportions of one mol of fluorine azide to not less than 1.6 mols of oxygen difluoride.

5. The process for making nitrogen trifluoride which comprises introducing gaseous fluorine azide and gaseous oxygen difluoride into a reaction zone in proportions of one mol of fluorine azide to not less than 1.6 mols of oxygen difluoride, subjecting the material in said zone, at temperature substantially in the range of zero–40° C., to actinic radiation in the range of 2000–5000 Angstrom units to effect reaction of fluorine azide and oxygen difluoride to form nitrogen trifluoride, and discharging from said zone gaseous reaction products containing nitrogen trifluoride.

6. The process of claim 5 in which temperature is substantially room temperature, and degree of actinic radiation lies in the range of 2500–4000 Angstrom units.

References Cited in the file of this patent

FOREIGN PATENTS 840,026    Great Britain _____ July 6, 1960